United States Patent
Tsai et al.

(10) Patent No.: US 10,607,016 B2
(45) Date of Patent: *Mar. 31, 2020

(54) DECRYPTING FILES FOR DATA LEAKAGE PROTECTION IN AN ENTERPRISE NETWORK

(71) Applicant: International Business Machines Corporation, Armonk, NY (US)

(72) Inventors: Ya Hsuan Tsai, Taipei (TW); Ying-Hung Yu, Taipei (TW); Hariharan Mahadevan, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,850

(22) Filed: Jul. 24, 2017

(65) Prior Publication Data

US 2018/0018467 A1     Jan. 18, 2018

Related U.S. Application Data

(63) Continuation of application No. 14/336,216, filed on Jul. 21, 2014, now Pat. No. 9,727,739, which is a continuation of application No. 14/142,155, filed on Dec. 27, 2013, now abandoned.

(30) Foreign Application Priority Data

Dec. 28, 2012  (TW) .............................. 101151161 A

(51) Int. Cl.
*G06F 21/60* (2013.01)
*G06F 16/16* (2019.01)
(Continued)

(52) U.S. Cl.
CPC ............ *G06F 21/60* (2013.01); *G06F 16/137* (2019.01); *G06F 16/162* (2019.01);
(Continued)

(58) Field of Classification Search
CPC ......... G06F 17/30117; G06F 17/30097; G06F 17/30162; G06F 17/30194;
(Continued)

(56) References Cited

U.S. PATENT DOCUMENTS

| 4,827,512 A | 5/1989 | Hirokawa et al. |
| 5,097,118 A | 3/1992 | Iijima |

(Continued)

FOREIGN PATENT DOCUMENTS

| CN | 101080695 A | 11/2007 |
| CN | 101615237 A | 12/2009 |

(Continued)

OTHER PUBLICATIONS

Secaas Implementation Guidance Catagory 2// Data Loss Prevention, Jul. 2012, pp. 1-22, Cloud Security Alliance, United States.

(Continued)

*Primary Examiner* — Shahriar Zarrineh
(74) *Attorney, Agent, or Firm* — Anthony V.S. England; Jeffrey S. LaBaw; Susan M. Maze

(57) ABSTRACT

Techniques are provided for decrypting an encrypted file within an enterprise network. The techniques include identifying by a password collecting module a password entered during a file encryption procedure performed at a terminal and storing the password; receiving an encrypted file by a data leakage protection (DLP) module; and attempting to decrypt the encrypted file with the password by the DLP module.

15 Claims, 4 Drawing Sheets

(51) Int. Cl.
*G06F 16/20* (2019.01)
*G06F 16/13* (2019.01)
*G06F 16/182* (2019.01)
*G06F 16/174* (2019.01)
*G06F 21/50* (2013.01)
*H04L 29/06* (2006.01)
*G06F 16/18* (2019.01)
*G06F 11/14* (2006.01)
*G06F 21/10* (2013.01)

(52) U.S. Cl.
CPC ........ *G06F 16/1756* (2019.01); *G06F 16/182* (2019.01); *G06F 16/20* (2019.01); *G06F 21/50* (2013.01); *G06F 21/606* (2013.01); *H04L 63/0227* (2013.01); *H04L 63/0428* (2013.01); *H04L 63/1408* (2013.01); *G06F 11/1458* (2013.01); *G06F 16/1873* (2019.01); *G06F 21/10* (2013.01)

(58) Field of Classification Search
CPC ........... G06F 17/30286; G06F 17/3023; G06F 21/10; G06F 21/60; G06F 21/50; G06F 21/606; H04L 63/0227; H04L 63/0428; H04L 63/1408
USPC .......................................................... 713/165
See application file for complete search history.

(56) References Cited

U.S. PATENT DOCUMENTS

| | | | |
|---|---|---|---|
| 5,584,023 A | 12/1996 | Hsu | |
| 5,991,402 A | 11/1999 | Jia et al. | |
| 6,240,184 B1* | 5/2001 | Huynh | G06F 21/31 380/206 |
| 6,711,687 B1* | 3/2004 | Sekiguchi | G06F 21/552 713/186 |
| 7,526,834 B2 | 5/2009 | Coleman | |
| 7,681,048 B2 | 3/2010 | Starr et al. | |
| 7,774,791 B1* | 8/2010 | Appelbaum | G06Q 10/06 705/1.1 |
| 7,801,747 B2* | 9/2010 | Califano | G06Q 50/22 705/3 |
| 7,802,096 B1* | 9/2010 | Matthews | G06F 21/606 380/45 |
| 7,814,317 B1* | 10/2010 | Matthews | H04L 63/0435 380/45 |
| 7,831,563 B2* | 11/2010 | Brown | G06F 17/30551 707/648 |
| 7,836,310 B1 | 11/2010 | Gutnik | |
| 7,917,946 B2 | 3/2011 | Lindholm et al. | |
| 7,950,051 B1* | 5/2011 | Spitz | G06F 21/31 380/277 |
| 7,991,747 B1 | 8/2011 | Upadhyay | |
| 8,224,796 B1 | 7/2012 | Shinde | |
| 8,286,253 B1 | 10/2012 | Lu et al. | |
| 8,296,570 B2* | 10/2012 | Hamid | G06F 21/31 713/165 |
| 8,387,110 B1 | 2/2013 | Cooper | |
| 8,438,630 B1 | 5/2013 | Clifford | |
| 8,510,369 B1 | 8/2013 | Ekke et al. | |
| 8,542,823 B1 | 9/2013 | Nguyen et al. | |
| 8,584,219 B1* | 11/2013 | Toole | G06F 21/60 726/25 |
| 8,707,452 B1* | 4/2014 | Block | G06F 21/34 380/30 |
| 8,726,396 B1* | 5/2014 | Dodke | G06F 21/6209 726/1 |
| 8,752,180 B2 | 6/2014 | Barile et al. | |
| 8,776,249 B1 | 7/2014 | Margolin | |
| 8,806,190 B1* | 8/2014 | Munshi | H04L 63/0428 713/153 |
| 8,825,773 B1 | 9/2014 | Gauvin | |
| 8,918,633 B2 | 12/2014 | Yoshihiro | |
| 8,943,546 B1 | 1/2015 | Khetawat | |
| 8,948,633 B2 | 2/2015 | Sasaki et al. | |
| 8,984,646 B2 | 3/2015 | Ohno et al. | |
| 9,003,475 B1 | 4/2015 | Jaiswal | |
| 9,081,974 B2 | 7/2015 | Schumacher | |
| 9,176,838 B2* | 11/2015 | Li | G06F 11/30 |
| 9,438,419 B1* | 9/2016 | Aggarwal | H04L 9/0863 |
| 2003/0005322 A1 | 1/2003 | Kiiveri | |
| 2003/0074567 A1 | 4/2003 | Charbonneau | |
| 2003/0084279 A1 | 5/2003 | Campagna | |
| 2003/0084297 A1 | 5/2003 | Spain et al. | |
| 2003/0110381 A1* | 6/2003 | Aoshima | G06F 21/31 713/168 |
| 2003/0200459 A1 | 10/2003 | Seeman | |
| 2005/0022012 A1 | 1/2005 | Bluestone et al. | |
| 2005/0044380 A1* | 2/2005 | Bostick | G06F 21/41 713/182 |
| 2005/0066167 A1 | 3/2005 | Asano et al. | |
| 2005/0086196 A1 | 4/2005 | Peterson | |
| 2005/0156027 A1* | 7/2005 | Munari | G07F 9/02 235/381 |
| 2006/0041932 A1* | 2/2006 | Cromer | H04L 9/0897 726/6 |
| 2006/0059350 A1 | 3/2006 | Cantwell et al. | |
| 2006/0117178 A1 | 6/2006 | Miyamoto et al. | |
| 2006/0206432 A1 | 9/2006 | Russell et al. | |
| 2007/0039042 A1* | 2/2007 | Apelbaum | G06F 21/46 726/6 |
| 2007/0216934 A1* | 9/2007 | Yamada | G06F 21/608 358/1.15 |
| 2007/0217609 A1 | 9/2007 | Sudo et al. | |
| 2008/0083037 A1* | 4/2008 | Kruse | G06F 21/88 726/27 |
| 2008/0222631 A1 | 9/2008 | Bhatia et al. | |
| 2009/0037984 A1 | 2/2009 | Andrasak et al. | |
| 2009/0150677 A1* | 6/2009 | Vedula | G06F 21/46 713/183 |
| 2009/0247125 A1* | 10/2009 | Grant | H04M 1/7253 455/411 |
| 2010/0030982 A1 | 2/2010 | Sela et al. | |
| 2010/0079571 A1 | 4/2010 | Hayashi | |
| 2010/0082364 A1 | 4/2010 | Taub | |
| 2010/0115614 A1 | 5/2010 | Barile | |
| 2010/0125891 A1 | 5/2010 | Baskaran | |
| 2010/0174902 A1 | 7/2010 | Wang | |
| 2010/0210126 A1 | 8/2010 | Everett | |
| 2010/0266129 A1 | 10/2010 | Tsuchiya | |
| 2010/0268934 A1 | 10/2010 | Hinton et al. | |
| 2010/0268955 A1 | 10/2010 | Ohno et al. | |
| 2010/0287619 A1* | 11/2010 | Chase | G06F 21/88 726/26 |
| 2011/0010550 A1 | 1/2011 | Sun | |
| 2011/0055593 A1* | 3/2011 | Lurey | G06F 21/31 713/193 |
| 2011/0083190 A1 | 4/2011 | Brown et al. | |
| 2011/0239306 A1 | 9/2011 | Avni et al. | |
| 2012/0060213 A1* | 3/2012 | Childress | G06F 21/31 726/18 |
| 2012/0110323 A1* | 5/2012 | Colclasure | G06F 21/41 713/153 |
| 2012/0131336 A1 | 5/2012 | Price et al. | |
| 2012/0131354 A1* | 5/2012 | French | G06F 21/602 713/189 |
| 2012/0137368 A1 | 5/2012 | Vanstone et al. | |
| 2012/0137375 A1 | 5/2012 | Ramachandran et al. | |
| 2012/0144500 A1* | 6/2012 | Kang | G06F 21/53 726/26 |
| 2012/0158768 A1 | 6/2012 | Lamanna et al. | |
| 2012/0203880 A1 | 8/2012 | Kluyt et al. | |
| 2012/0210126 A1 | 8/2012 | Johnson et al. | |
| 2012/0216046 A1 | 8/2012 | McDougal et al. | |
| 2012/0222110 A1 | 8/2012 | Huang et al. | |
| 2013/0111219 A1 | 5/2013 | Avanch et al. | |
| 2013/0145447 A1* | 6/2013 | Maron | G06F 21/31 726/6 |
| 2013/0212385 A1* | 8/2013 | Schechter | G06F 21/31 713/168 |

(56) References Cited

U.S. PATENT DOCUMENTS

| | | |
|---|---|---|
| 2013/0227280 A1 | 8/2013 | Quinlan et al. |
| 2013/0238901 A1 | 9/2013 | Wise |
| 2013/0340031 A1 | 12/2013 | Amit et al. |
| 2014/0013112 A1* | 1/2014 | Cidon .............. G06F 21/6218 713/165 |
| 2014/0108792 A1 | 4/2014 | Borzycki et al. |
| 2014/0173412 A1* | 6/2014 | MacAulay .............. G06F 21/60 715/234 |
| 2015/0074405 A1 | 3/2015 | Zucker |
| 2015/0113279 A1* | 4/2015 | Andersen ............ H04L 63/0457 713/171 |

FOREIGN PATENT DOCUMENTS

| | | |
|---|---|---|
| CN | 103077163 A | 5/2013 |
| EP | 0526054 A2 | 2/1993 |
| JP | 4918638 B2 | 4/2012 |
| TW | 200522650 A | 7/2005 |
| TW | 200905516 A | 2/2009 |
| TW | 201030557 A | 8/2010 |
| WO | 2012109533 A1 | 8/2012 |

OTHER PUBLICATIONS

Demystifying Data Loss Prevention, 2010, pp. 1-11, McAfee, Inc, United States.

Code Green Networks, Integrating Data Loss Prevention & Email Encyption, 2011, pp. 1-2, Zixcorp, United States.

Data Loss Prevention, White Paper, 2012, pp. 1-8, CDW, United States.

Checkpoint Software Technologies, Inc; "Data Loss Prevention Software Blade," downloaded from <https://www.checkpoint.com/products/dlp-software-blade/> on Mar. 3, 2016.

* cited by examiner

Figure 3

| NO. | PASSWORD | PREVIOUS TIME AND DATE | NO. OF INSTANCES | APPLICATION | FILE FORMAT | HASH VALUE | USER ID |
|---|---|---|---|---|---|---|---|
| 1 | SH9M';Mk | 2012.04.20 16:35:02 | 5 | Winzip.exe 7z.exe | zip rar | \<value1\> \<value2\> \<value3\> | wesley@9.191.29.138 |
| 2 | 5hS+N>;1 | 2012.04.16 15:03:12 | 3 | winword.exe symphony.exe | doc odt | \<value4\> | Hari@workpc.tw.ibm.com |
| 3 | J4LslqlS | 2012.04.08 10:12:23 | 9 | AcroRd32.exe | pdf | \<value5\> | Edward@9.191.7.5 |
| 4 | p4wvwt2E | 2012.03.28 22:42:05 | 22 | Winzip.exe | zip | \<value6\> \<value7\> | Hari@9.191.52.102 |

DECRYPTING FILES FOR DATA LEAKAGE PROTECTION IN AN ENTERPRISE NETWORK

CROSS-REFERENCES TO RELATED APPLICATIONS

The present application is a continuation and claims the benefit of the filing date of an application entitled, "Decrypting Files for Data Leakage Protection in an Enterprise Network" Ser. No. 14/336,216, filed Jul. 21, 2014, which is a continuation and claims the benefit of the filing date of an application entitled, "Decrypting Files for Data Leakage Protection in an Enterprise Network" Ser. No. 14/142,155, filed Dec. 27, 2013, both of which are assigned to the assignee of the present application, and herein incorporated by reference.

FIELD OF THE DISCLOSURE

The claimed subject matter relates to enterprise data leakage protection (DLP), and more particularly, to decrypting encrypted files in order to provide data leakage protection (DLP).

DESCRIPTION OF THE PRIOR ART

To ensure that confidential data will not leak out through a means of electronic communication, for example, the Internet, enterprises use a data leakage protection (DLP) mechanism to check for confidential data in their outbound communication contents. See Check Point DLP Software Blade produced by Check Point Software Technologies Ltd.

To conduct the DLP checkup thoroughly, it is necessary to decrypt encrypted files whenever the encrypted files are discovered in communication contents. Related prior art discloses attempting to decrypt encrypted files by a brute-force attack, though this approach is conceivably time-consuming. Furthermore, US Pub. 2012/0216046 discloses parsing text contents of emails to create a dictionary required for a brute-force attack.

SUMMARY

It is an aspect of the claimed subject matter to provide techniques for collecting in advance passwords entered during a file encryption procedure performed at a terminal within an enterprise network, storing the passwords collected, creating a password list, and attempting to decrypt according to the password list whenever it is necessary to decrypt encrypted files, so as to perform a DLP checkup within the enterprise network.

Most of the encrypted files to be sent out of an enterprise network have already undergone a file encryption procedure performed at a terminal within the enterprise network. Hence, the aforesaid techniques enhance the accuracy of passwords greatly and dispenses with the hassle of attempting to decrypt indiscriminately by a brute-force attack.

Another aspect of the claimed subject matter is to provide techniques for creating a short list of collected passwords in contrast with a dictionary for use in a brute-force attack to thereby solve a problem, that is, passwords which are conceivable by business users and adapted for use in encryption within an enterprise network are relatively scarce. Conceivably, in the course of attempting to decrypt, a DLP checkup conducted with a password list created in accordance with the claimed subject matter takes less time than one conducted with a dictionary according to the prior art; hence, the claimed subject matter shortens the duration of service interruption and thus enables a real-time DLP checkup.

Yet another aspect of the claimed subject matter is to provide techniques whereby passwords entered by users are efficiently identified by monitoring a specific application (such as 7-Zip or Microsoft Word) executed at a terminal within an enterprise network and a file encryption procedure performed by means of the application. In so doing, the techniques of the claimed subject matter dispense with the hassle of monitoring all the operations performed or data entered by users at the terminal all the time. Hence, the techniques of the claimed subject matter not only prevent privacy infringement, but also reduce the required system resources greatly.

The techniques of the claimed subject matter provides, in an embodiment thereof, techniques for collecting decrypting passwords for encrypted files within an enterprise network. The techniques comprise:
  monitoring an application executed at a terminal;
  monitoring a procedure performed with a predetermined application executed at the terminal; and
  identifying a password entered by users for a file encryption procedure performed with the predetermined application.

The claimed subject matter provides, in another embodiment thereof, techniques for decrypting an encrypted file within an enterprise network. The techniques comprise:
  receiving an encrypted file from a terminal; and
  attempting to decrypt the encrypted file with the decrypting passwords obtained by the method of collecting decrypting passwords for encrypted files within an enterprise network.

The claimed subject matter provides, in another embodiment thereof, techniques for decrypting an encrypted file within an enterprise network. The techniques comprise:
  identifying by a password collecting module a first password entered during a first file encryption procedure performed at a terminal, and storing the first password;
  receiving an encrypted file by a data leakage protection (DLP) module; and
  attempting to decrypt the encrypted file with the first password by the DLP module.

The claimed subject matter further provides, in yet another embodiment thereof, an apparatus and a computer-readable medium or a computer program product for implementing the aforesaid techniques.

Reference throughout this specification to features, advantages, or similar language does not imply that all of the features and advantages that may be realized with the claimed subject matter should be or are in any single embodiment of the claimed subject matter. Rather, language referring to the features and advantages is understood to mean that a specific feature, advantage, or characteristic described in connection with an embodiment is included in at least one embodiment of the claimed subject matter. Thus, discussion of the features and advantages, and similar language, throughout this specification may, but do not necessarily, refer to the same embodiment.

Furthermore, the described features, advantages, and characteristics of the claimed subject matter may be combined in any suitable manner in one or more embodiments. One skilled in the relevant art will recognize that the claimed subject matter may be practiced without one or more of the specific features or advantages of a particular embodiment. In other instances, additional features and advantages may be recognized in certain embodiments that may not be present in all embodiments of the claimed subject matter.

The following description, the appended claims, and the embodiments of the claimed subject matter further illustrate the features and advantages of the claimed subject matter.

BRIEF DESCRIPTION OF THE DRAWINGS

In order that the advantages of the claimed subject matter will be readily understood, a more particular description of the claimed subject matter briefly described above will be rendered by reference to specific embodiments that are illustrated in the appended drawings. Understanding that these drawings depict only typical embodiments of the claimed subject matter and are not therefore to be considered to be limiting of its scope, the claimed subject matter will be described and explained with additional specificity and detail through the use of the accompanying drawings.

FIG. 3 shows a password table PT according to a specific embodiment of the claimed subject matter.

DETAILED DESCRIPTION OF THE EMBODIMENTS

Figure 1:
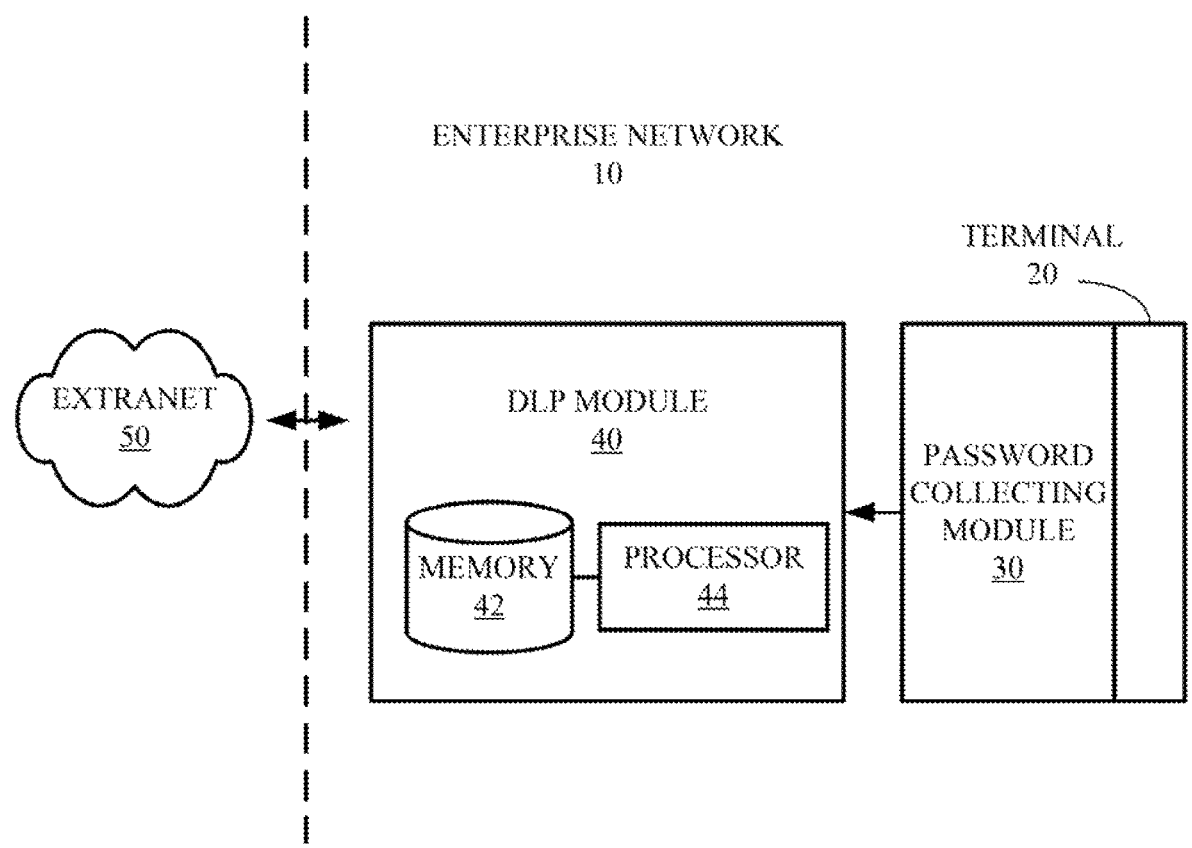
FIG. 1 is a schematic view of an enterprise network according to a specific embodiment of the claimed subject matter.

Reference throughout this specification to "one embodiment," "an embodiment," or similar language means that a particular feature, structure, or characteristic described in connection with the embodiment is included in at least one embodiment of the claimed subject matter. Thus, appearances of the phrases "in one embodiment," "in an embodiment," and similar language throughout this specification may, but do not necessarily, all refer to the same embodiment.

As will be appreciated by one skilled in the art, the claimed subject matter may be embodied as an apparatus, a method or a computer program product. Accordingly, the claimed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the claimed subject matter may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the claimed subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The claimed subject matter is described below with reference to flowchart illustrations and/or block diagrams of methods, apparatus (systems) and computer program products according to embodiments of the claimed subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 4, apparatuses, methods, and computer program products are illustrated as structural or functional block diagrams or process flowcharts according to various embodiments of the claimed subject matter. The flowchart and block diagrams in the Figures illustrate the architecture, functionality, and operation of possible implementations of systems, methods and computer program products according to various embodiments of the claimed subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Architecture>

Referring to FIG. 1, there is shown a schematic view of an enterprise network 10 according to a specific embodiment of the claimed subject matter. The enterprise network 10 comprises a terminal 20, a password collecting module 30, and a data leakage protection (DLP) module 40. Terminal 20 is provided in the form of a personal mobile device (for example, iPhone or iPad of Apple Inc.) or a personal computer and adapted to communicate (for example, file transfer or sending emails) with an extranet 50 outside the enterprise network 10. Although only one terminal 20 is shown in FIG. 1, persons skilled in the art understand that the claimed subject matter does not set forth a limit to the quantity of terminal 20.

Figure 2:
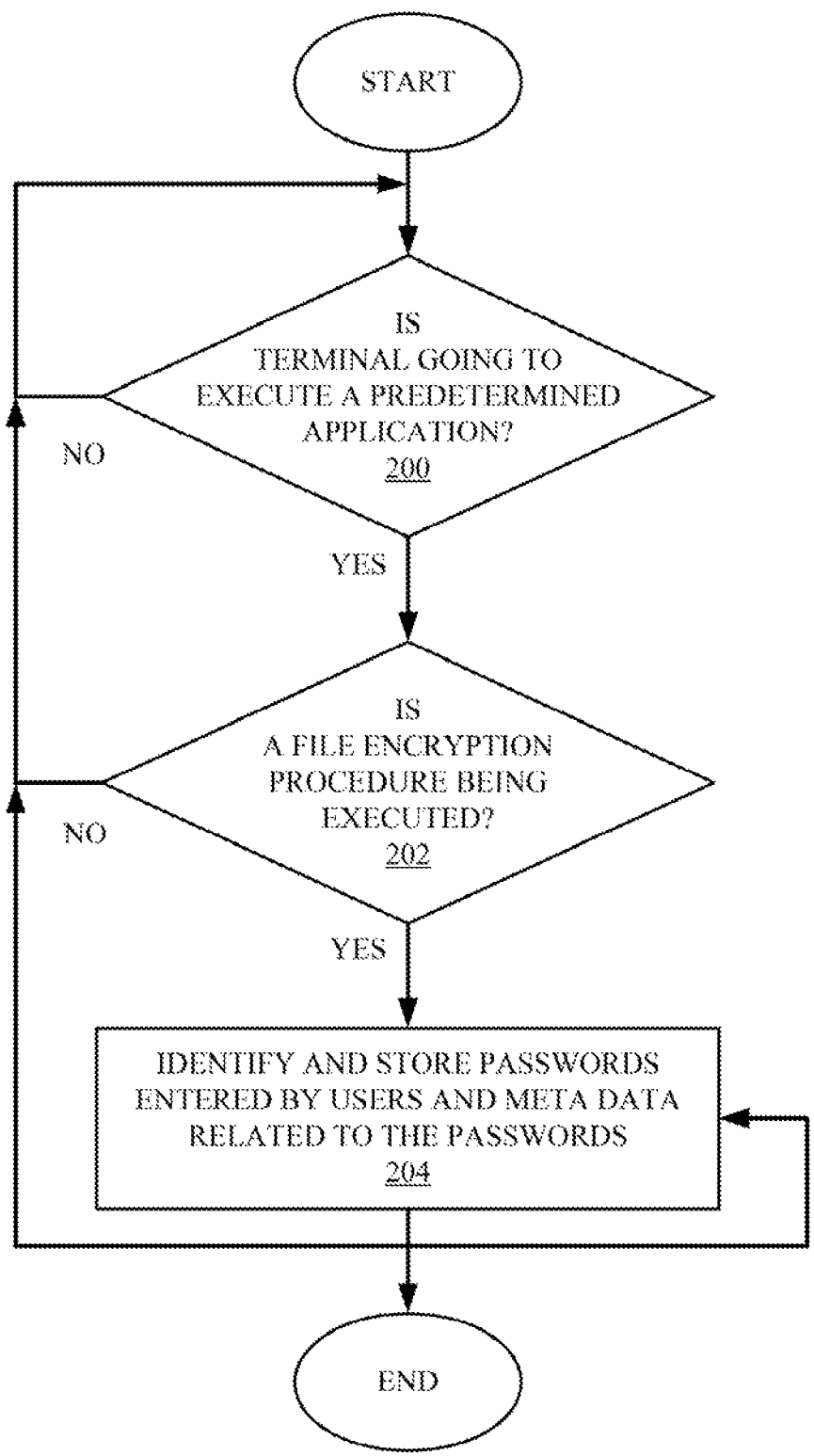
FIG. 2 is a flow chart of a method of collecting passwords according to a specific embodiment of the claimed subject matter.
Figure 4:
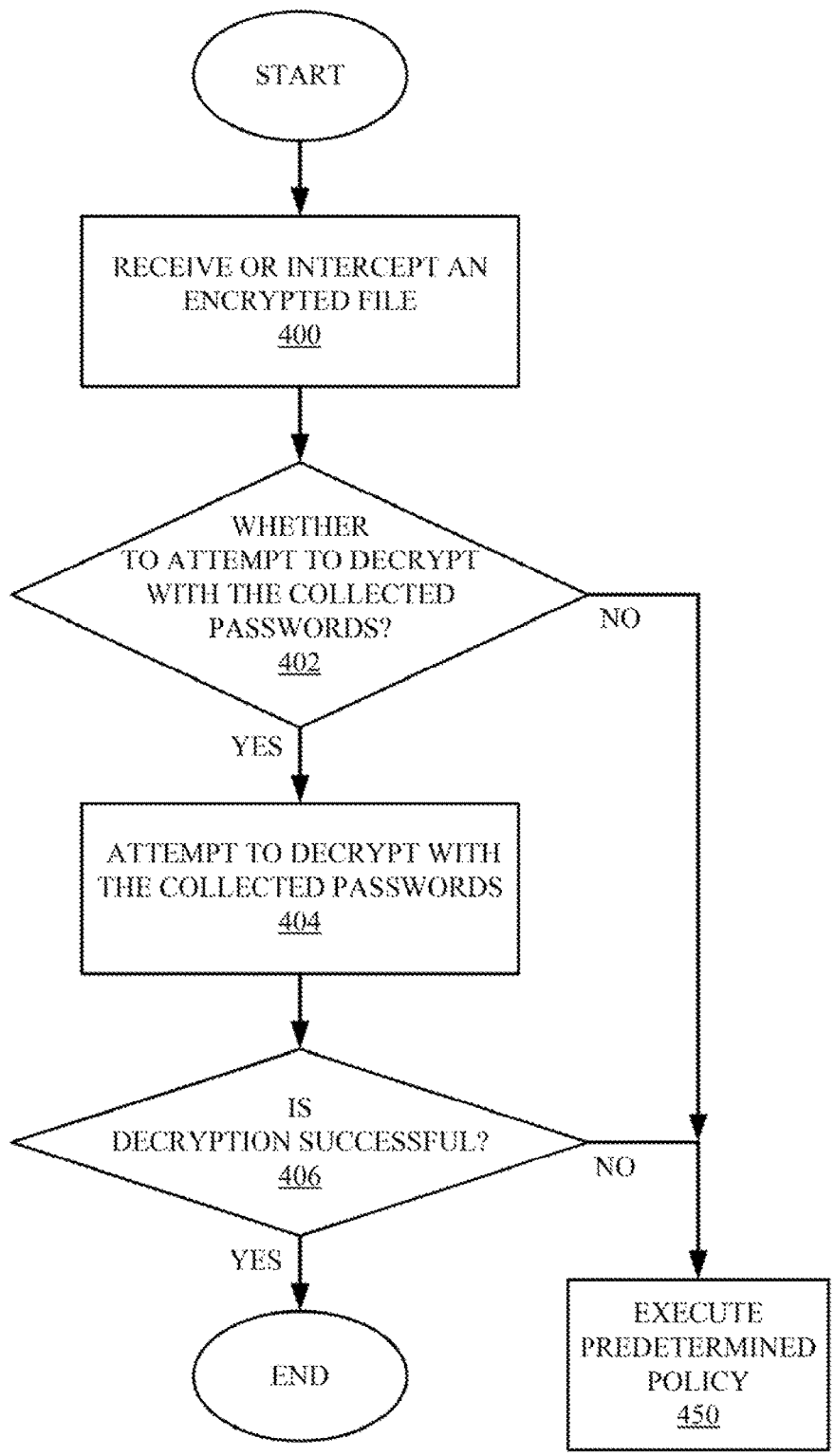
FIG. 4 is a flow chart of a method of attempting to decrypt according to a specific embodiment of the claimed subject matter.

Details of password collecting module 30 and DLP module 40 are further illustrated with FIG. 2 through FIG. 4. In addition to password collecting module 30 and DLP module 40, enterprise network 10 provides an existing protection mechanism (not shown) pertaining to data leakage or data security with respect to the communication of terminal 20 and extranet 50. For more information, make reference to Check Point DLP Software Blade manufactured by Check Point Software Technologies Ltd. or Security Network Protection XGS 5000 manufactured by International Business Machines Corp. Hence, the methods and the apparatus of the claimed subject matter can be integrated into the existing protection mechanism, especially next-generation firewalls.

<Password Collecting Module>

Password collecting module 30 is preferably provided in the form of software, for example, in the form of a daemon operating on terminal 20; the claimed subject matter is not restrictive thereof, as password collecting module 30 of the claimed subject matter can also be provided in the form of standalone hardware, such as an apparatus. Referring to FIG. 2, there is shown a flow chart of a method of collecting passwords according to a specific embodiment of the claimed subject matter, wherein password collecting module 30, provided in the form of a daemon, collects passwords.

Block 200: starts password collecting module 30 disposed on terminal 20 to monitor and determine whether terminal 20 is going to execute one or more predetermined applications. Go to block 202 when the determination is affirmative, otherwise keep performing block 200.

In this embodiment, password collecting module 30 communicates with the operating system (for example, the task manager in the Windows operating system) of terminal 20, so as to be informed of any application to be executed on the terminal 20.

Before this block, it is feasible to register, optionally, any concerned applications, especially any applications susceptible to an encryption procedure such as 7-Zip, Microsoft Word, WinRAR, and Microsoft Outlook, with password collecting module 30 beforehand; hence, password collecting module 30 can ignore those applications which are not registered, thereby saving system resources.

Block 202: monitor and determine by password collecting module 30 as to whether the application is executing a file encryption procedure. Go to block 204 when the determination is affirmative, otherwise go back to block 200.

In this embodiment, password collecting module 30 is capable of detecting a processing process of the application or an action of a graphical user interface (GUI) object to thereby determine a procedure currently being performed by the application. For more information, make reference to Spy++ developed by Microsoft.

When performing a file encryption procedure, an application typically provides a specific user interface message or prompt and requests the user to enter a password. Hence, password collecting module 30 detects the specific user interface message or prompt to thereby determine a file encryption procedure currently being executed by the application.

Block 204: identify by password collecting module 30 passwords entered by the user during an encryption procedure being executed by the application (for example, by means of the specific user interface message or prompt.) The identifying of passwords by password collecting module 30 can be implemented by keystroke tracking or any conventional technique of detecting user's input, of which the claimed subject matter is not restrictive. After identifying the passwords, password collecting module 30 sends the passwords to DLP module 40, such that the passwords are stored therein to create a password table PT. Afterward, the process flow of the method either ends or returns to block 200 or block 202 such that the process flow can be executed repeatedly to obtain multiple passwords which are then stored in the password table PT.

In another embodiment, password collecting module 30 not only identifies passwords, but also identifies meta data related to the passwords, including, but not limited to, time and date of file encryption, application name, encrypted file format (such as a filename extension), hash value of an encrypted file, and a user ID for use in the login of the application. Password collecting module 30 sends the meta data and the passwords together to DLP module 40, such that the meta data and the passwords are stored in the password table PT, as shown in FIG. 3. Further details are describe below.

<DLP Module>

Terminal 20, password collecting module 30, and DLP module 40 are disposed in enterprise network 10 and communicate with each other via the network-based connection, including a fixed LAN or WAN, or any means of connection other than wired connection and wireless connection, provided by enterprise network 10.

DLP module 40 is preferably provided in the form of an apparatus and integrated into an existing access point, router, switch, gateway, firewall device, proxy, or intrusion prevention system (IPS) device, for example.

DLP module 40 provided in the form of an apparatus comprises a memory 42 and a processor 44. Memory 42 is a computer magnetic disk, hard disk drive, random-access memory (RAM), read-only memory (ROM), erasable programmable read-only memory (EPROM or flash memory), compact disk, optical storage device, or magnetic storage device. Memory 42 stores a program code and, for example, the password table PT shown in FIG. 3. Processor 44 accesses the program code and the password table PT from memory 42 to thereby execute a predetermined program, as illustrated with FIG. 4. Persons skilled in the art understand that the hardware of DLP module 40 illustrated with FIG. 1 varies from embodiment to embodiment. Furthermore, in another embodiment of the claimed subject matter, intrinsic hardware or peripheral devices, such as flash read-only memory (flash ROM), equivalent non-volatile memory, or CD-ROM can be included in or can substitute for the hardware illustrate with FIG. 1.

In another embodiment, a plugin module for use with the application operates on terminal 20. For more information, refer to the operation principle of plugin modules for use with an existing Web browser or word processing software.

Referring to FIG. 4, there is shown a flow chart of a method of attempting by DLP module 40 to decrypt according to a specific embodiment of the claimed subject matter. The embodiment described hereunder is merely intended for a single encrypted file of a single terminal 20, but persons skilled in the art understand that it is feasible for DLP module 40 to perform the process flow (depicted in FIG. 4) on different files at different terminals 20 simultaneously or different files at the same terminal 20.

Block 400: receive or intercept by DLP module 40 an encrypted file from terminal 20, wherein, for the technique of file interception, please refer to a conventional DLP or firewall mechanism. This block optionally comprises the sub-block of identifying meta data of encrypted file, such as file format, hash value, and user ID of the source of the file sent. For more information, please refer to Security Network Protection XGS 5000 developed by International Business Machines Corp. or other next-generation firewalls.

Block 402 (optional): determine preliminarily by DLP module 40 as to whether to attempt to decrypt (for example, by comparing meta data of encrypted files and meta data of passwords collected by password collecting module 30) with the passwords collected by password collecting module 30 according to the identified meta data of the encrypted files. Go to block 404 to attempt to decrypt when the determination is affirmative, otherwise go to block 450 to execute a predetermine policy, for example, refusing to send the encrypted files to extranet 50, or sending messages to request encrypted file senders to provide passwords.

Block 404: attempt by DLP module 40 to decrypt encrypted files received in block 400, using passwords (see the process flow of FIG. 2 and the password table PT of FIG. 3) collected by password collecting module 30. Preferably, block 404 is performed in a real-time manner, that is, immediately after block 400.

In this block, if the password table PT contains multiple passwords, DLP module 40 will further tidy up and sort the password table PT. The password table PT in the embodiment illustrated with FIG. 3 is sorted according to the time and date of file encryption. DLP module 40 calculates the number of instances of use of each password and adds it to a related field in the password table PT. In another embodiment, DLP module 40 sorts the password table PT according to the number of instances of use, application name, file format, hash value, or user ID. The sorting result functions as the basis of priority given to a decryption attempt.

In another embodiment, DLP module 40 calculates the degree of match between an encrypted file and each password according to a comparison of meta data of the encrypted file and meta data of each password collected by password collecting module 30, so as to determine the priority given to a decryption attempt. DLP module 40 determines the way of calculating the degree of match as needed, or adjusts the weight assigned to each item in the meta data for the purpose of calculating the degree of match, of which the claimed subject matter is not restrictive. For instance, DLP module 40 may assign a greater weight to file format than to user ID in calculating the degree of match.

Block 406: end the process flow as soon as the decryption is successful. Go to block 450 to execute a predetermined policy if it is impossible to decrypt all the passwords.

The foregoing preferred embodiments are provided to illustrate and disclose the technical features of the claimed subject matter, and are not intended to be restrictive of the scope of the claimed subject matter. Hence, all equivalent variations or modifications made to the foregoing embodiments without departing from the spirit embodied in the disclosure of the claimed subject matter should fall within the scope of the claimed subject matter as set forth in the appended claims.

What is claimed is:

1. A method for providing data leak protection (DLP), comprising:

determining, by a processor, that a predetermined application executing at a terminal is in the process of transmitting an encrypted file from the terminal; and in response to determining that the encrypted file is being transmitted from the terminal, identifying, by the processor, a password that decrypts the encrypted file;

decrypting, by the processor, the encrypted file to generate a decrypted file;

determining, by the processor, that the decrypted file is a file subject to DLP;

in response to determining that the decrypted file is a file subject to DLP, preventing, by the processor, the transmitting of the file from the terminal;

identifying meta data of the encrypted file, wherein the decrypting further comprises selecting the password by determining that meta data of the encrypted file matches at least a portion of meta data of the password; and identifying meta data of the encrypted file, wherein the decrypting further comprises determining a degree of match between meta data of the encrypted file and meta data of the multiple passwords obtained by comparing meta data associated with the encrypted file with meta data associated with the password several times, so as to determine priority given to a decryption performed with each of the multiple passwords.

2. The method of claim 1, further comprising generating a list of passwords associated with the predetermined application, wherein the identifying the password comprises selecting the password from the list of passwords.

3. The method of claim 2, further comprising storing in conjunction with the list a number of times each password on the list has been employed, wherein the selecting the password from the list is based upon the number of times each password has been employed.

4. The method of claim 1, further comprising storing a first password entered during a first file encryption procedure performed at the terminal, wherein the identifying the password comprises selecting the first password.

5. An apparatus for providing data leak protection (DLP), comprising:
   a processor;
   a non-transitory, computer-readable medium coupled to the processor; and
   logic, stored on the computer-readable medium and executed on the processor, for:
      determining that a predetermined application executing at a terminal is in the process of transmitting an encrypted file from the terminal; and
      in response to determining that the encrypted file is being transmitted from the terminal, identifying a password that decrypts the encrypted file;
      decrypting the encrypted file to generate a decrypted file;
      determining that the decrypted file is a file subject to DLP;
      in response to determining that the decrypted file is a file subject to DLP, preventing the transmitting of the file from the terminal;
      identifying meta data of the encrypted file, wherein the decrypting further comprises selecting the password by determining that meta data of the encrypted file matches at least a portion of meta data of the password; and
      identifying meta data of the encrypted file, wherein the decrypting further comprises determining a degree of match between meta data of the encrypted file and meta data of the multiple passwords obtained by comparing meta data associated with the encrypted file with meta data associated with the password several times, so as to determine priority given to a decryption performed with each of the multiple passwords.

6. The apparatus of claim 5, the logic further comprising logic for generating a list of passwords associated with the predetermined application, wherein the identifying the password comprises selecting the password from the list of passwords.

7. The apparatus of claim 6, the logic further comprising logic for storing in conjunction with the list a number of times each password on the list has been employed, wherein the selecting the password from the list is based upon the number of times each password has been employed.

8. The apparatus of claim 5, the logic further comprising logic for storing a first password entered during a first file encryption procedure performed at the terminal, wherein the identifying the password comprises selecting the first password.

9. A computer programming product for providing data leak protection (DLP), comprising:
   a non-transitory, computer-readable medium; and
   logic, stored on the computer-readable medium for execution on a processor, for:
      determining, by the processor, that a predetermined application executing at a terminal is in the process of transmitting an encrypted file from the terminal; and,
      in response to determining that the encrypted file is being transmitted from the terminal, identifying, by the processor, a password that decrypts the encrypted file;
      decrypting, by the processor, the encrypted file to generate a decrypted file;
      determining, by the processor, that the decrypted file is a file subject to DLP;
      in response to determining that the decrypted file is a file subject to DLP, preventing, by the processor, the transmitting of the file from the terminal;
      identifying meta data of the encrypted file, wherein the decrypting further comprises selecting the password by determining that meta data of the encrypted file matches at least a portion of meta data of the password; and
      identifying meta data of the encrypted file, wherein the decrypting further comprises determining a degree of match between meta data of the encrypted file and meta data of the multiple passwords obtained by comparing meta data associated with the encrypted file with meta data associated with the password several times, so as to determine priority given to decryption performed with each of the multiple passwords.

10. The computer programming product of claim 9, the logic further comprising logic for generating a list of passwords associated with the predetermined application, wherein the identifying the password comprises selecting the password from the list of passwords.

11. The computer programming product of claim 10, the logic further comprising logic fur storing in con unction with the list a number of times each password on the list has been employed, wherein the selecting the password from the list is based upon the number of times each password has been employed.

12. The computer programming product of claim 9, the logic further comprising logic for storing a first password entered during a first file encryption procedure performed at the terminal, wherein the identifying the password comprises selecting the first password.

13. The method of claim 1, the determining that the decrypted file is a file subject to DLP comprising checking for confidential content in the decrypted file.

14. The apparatus of claim 5, the logic for determining that the decrypted file is a file subject to DLP comprising checking for confidential content in the decrypted file.

15. The computer programming product of claim 9, the logic for determining that the decrypted file is a file subject to DLP comprising checking for confidential content in the decrypted file.

* * * * *